INVENTOR
R. URTEL
BY
ATTORNEY $i_R + i_D = i_a$

INVENTOR
R. URTEL
BY
ATTORNEY

United States Patent Office 2,774,911
Patented Dec. 18, 1956

2,774,911

CIRCUIT ARRANGEMENT FOR THE GENERATION OF SAW-TOOTH SHAPED DEFLECTING CURRENTS

Rudolf Urtel, Pforzheim, Germany, assignor to International Standard Electric Corporation, New York, N. Y., a corporation of Delaware Application February 8, 1954, Serial No. 408,967

5 Claims. (Cl. 315—27)

The invention relates to circuit arrangements for the generation of saw-tooth shaped currents of a high frequency for the time-linear magnetic deflection of the electron beam in cathode-ray tubes, in particular for the line scanning in television cathode-ray tubes, and is aimed to reduce the high direct voltage required in conventional types of circuits. Such circuits may require about 400 volts for proper operation. Thus by this system the necessary battery voltage may be made equal to or smaller than the existing mains voltage which is sufficient for the operation of the television receiver.

Figure 1:
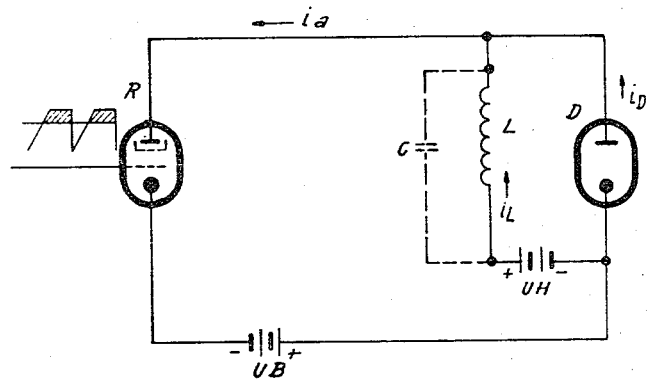
Figure 2:
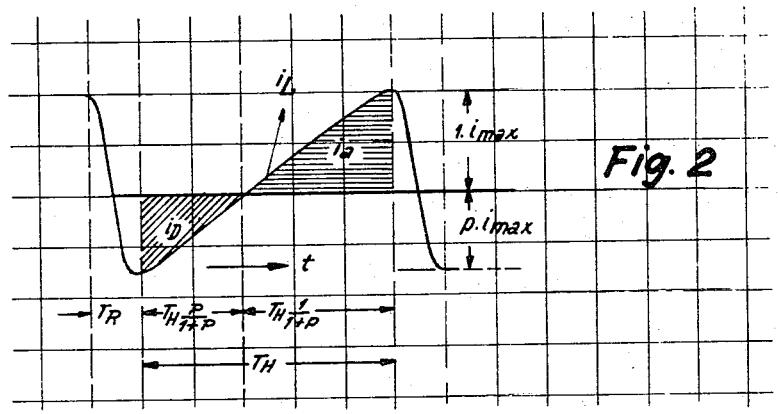

The basic circuit arrangement, on which the majority of the line scanning circuits are based, is shown in Figs. 1 and 2 of the drawings. The deflecting coils L are arranged in the anode cathode circuit of a tube R having a low internal resistance, the grid of which is controlled e. g. with rectangular impulses and in parallel with which there is arranged a diode D with a likewise low internal resistance.

The path of the deflecting current $i_L$ in the deflecting yokes is shown in Fig. 2. During the time $T_H$ there is effected a linear increase of current with $$\frac{di_L}{dt} = \frac{1}{L} U_H$$

At the moment of the horizontal retrace (zero passage of $i_L$), the tube R will be modulated by the grid impulse. The anode current $i_a$ increases. The blocking of the tube R by the termination of the impulse applied to the grid, effects a termination of the anode current and which, in turn, releases the free oscillating process in the coil L. After one semi-oscillation the diode D will open and the current, increasing from negative values towards zero will recharge the battery $U_H$. The required operating voltages will be delivered by the battery UB, covering the remaining anode voltage, necessary for producing the anode current, at the tube R, and by the battery $U_H$, producing the forward voltage.

For the setting of the coil voltage it may be of advantage to choose the anode current somewhat larger than the required coil current. The surplus will flow over the diode path.

It is now desired, e. g. for a universal operation, to reduce the necessary battery voltage and to save the battery $U_H$ by replacing it by a charged condenser. This, however, requires that the integral $\int i_c dt$ becomes equal to zero, in which case $i_c$ denotes the condenser current. From Fig. 2 it may be seen that this condition is not complied with, because owing to the attenuation of the free oscillating process (amplitude relation $1:p$) the charge of the battery by the diode current $i_D$ $$\left(Q_D = \frac{1}{2} i_{D_{max}} \cdot T_H \cdot \frac{p}{1+p}\right)$$

is smaller than the discharge by the anode current $i_a$ $$\left(Q_A = \frac{1}{2} i_{a_{max}} \cdot T_H \cdot \frac{1}{1+p}\right)$$

As a solution a circuit arrangement has become known with which the deflecting yokes (coils) are coupled via a transformer to the switching tube R, and the diode D is coupled in a stepped-down manner, e. g. in such a way that the current portions $i_D$ and $i_a$ of Fig. 2 become equal. In such a case the integral $\int i_c dt$ will be equal to zero. This arrangement, however, bears the disadvantage that a complicated transformer will be necessary for the transmission of the total output and that, on account thereof, additional losses will appear. Further it is known to arrange an oscillating system in the anode lead-in of the tube R which, by means of the coupling oscillation, subsequently delivers the energy which has been lost in the coil oscillating circuit. The disadvantage of this circuit arrangement consists in that the energy can only be partially restored in the oscillating system and that the oscillating circuit swings out freely, thereby causing disturbances.

The inventive circuit arrangement for the generation of saw-tooth shaped currents in the deflecting coils of a cathode-ray tube, particularly for television purposes, with which a switching diode is arranged in parallel with the deflecting coils and in which the diode current charges a condenser (booster) acting as a direct current source, is characterized in that an energy accumulator is arranged in the anode circuit of the switching tube, said energy storage being charged by the anode current and the energy of which serves the recharging of the leakage of charge of the condenser caused by the losses occurring at the deflecting coils.

Figure 3:
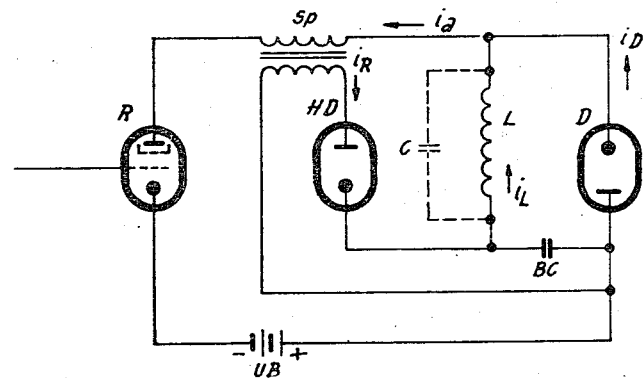
Figure 4:
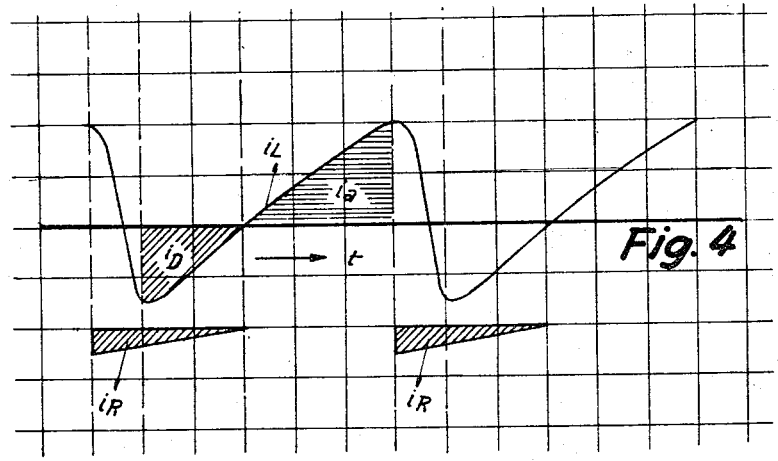

Some examples of embodiment of the invention will now be particularly described with reference to the accompanying drawings, of which Fig. 1 shows a conventional type deflecting (line scanning) circuit, Fig. 2 the deflecting current in the deflecting coil, during one period, Figs. 3, 5 and 6 some examples of embodiment of the inventive circuit arrangement, and Fig. 4 is a diagram serving to explain Fig. 3.

In the inventive circuit arrangement of Fig. 3 the deflecting coils L with their natural capacity C are arranged, like in Fig. 1, in the anode circuit of the switching tube R. To the deflecting coils there is connected in parallel the switching diode D, and DC denotes the booster-condenser which, in a charged state, takes the place of the source of voltage $U_H$ of Fig. 1. For restoring the leakage in the charge of the condenser DC, caused by losses of the coils, the invention provides the arrangement of a storage device in the anode circuit of the tube R. This storage device consisting of an inductance Sp designed as a transformer. During the flow of anode current, i. e. during the increase of $i_a$, energy will be stored in the inductance serving after the disconnection of the anode current, and via an auxiliary diode HD, the charging of the condenser BC. Hence in this case there is concerned a recharging of the booster-condenser BC and not, as with one of the conventional types of circuit arrangements, a redelivery of the energy into the coil oscillating circuit LC during the time of the line retrace. By means of the inventive circuit arrangement the voltage UB covers the anode rest potential and the voltage drop at the storage Sp. Since in the case of an equal current existing in L and Sp, the energy to be stored in Sp is small in relation to the one in L, Sp will become smaller than L and, accordingly, $U_B < U_H$. A voltage source of about 150 to 200 volts direct-current is sufficient for feeding the battery UB, so that a television receiver employing such a deflecting circuit can also be fed from a 200 volts D. C.-mains, if the anode voltage for the cathode-ray tube is produced in the conventional manner for the voltage peaks occurring at the line or horizontal retrace.

In Fig. 4, which is practically the same as Fig. 2, the current is denoted by $i_R$. With the aid of the storage $Sp$ (Fig. 3) this current is applied additionally to the booster-condenser BC. It should be $$\bar{i}_R + \bar{i}_D = \bar{i}_a$$

The time during which the tube R is blocked, hence during the retrace and the first part of the forward movement, can be disposed of for recharging the booster-condenser BC. Only very small currents $i_R$ are required and the auxiliary diode HD, therefore, may be a very simple one. Likewise, the transformer $Sp$ only transmits a very small output and there will be effected a complete recovery of the amount of energy stored in the transformer $Sp$. There will also occur no free oscillating processes, because the discharge is always performed at current zero.

It is still to be pointed out that the re-charging of the booster-condenser BC can also be effected during the increase of the anode current itself, and that this can be achieved in a simple way thereby that the transformer $Sp$ is given a reversed polarity.

Figure 5:
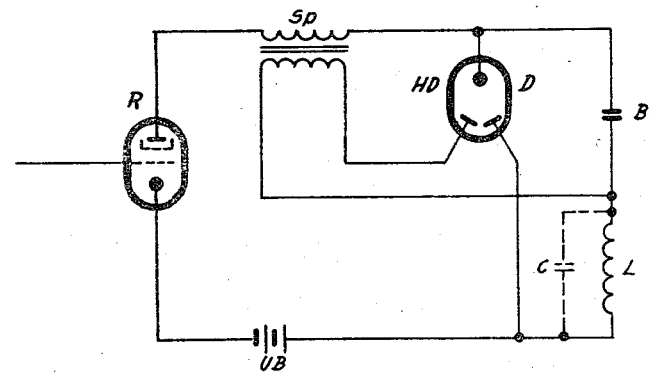

Fig. 5 shows a circuit arrangement with which the switching diode D and the auxiliary diode HD are accommodated as a double diode (duo-diode) in the bulb of a tube, thus creating the advantage of heating the duo-diode in a more simplified manner. For the rest, the reference numerals of Fig. 5 correspond to those of Fig. 3.

For reasons of dimensioning, it may be of some convenience to incorporate into the circuit of the auxiliary diode HD, also the source of current UB. Owing to the fact that in Fig. 3 $Sp$ becomes smaller than L, there will be obtained small battery voltages of UB. In order to also enable this circuit arrangement to be operated economically with greater battery voltages, e. g. from the 220 volts network (mains), the transformer $Sp$ can be designed larger than would correspond to the amount of energy to be recharged, and to deliver the surplus amount of energy, e. g. back to the battery.

Figure 6:
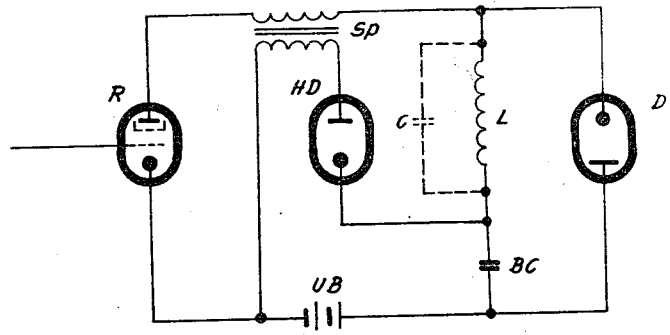

One example of embodiment relating to this particular case is shown in Fig. 6 of the drawings. In this case a surplus energy will be stored in the transformer $Sp$ and will be delivered back to the battery UB during the charging process. To this end the secondary winding of the transformer $Sp$ is wired via the series connection of the battery UB with the booster-condenser BC.

In addition to the inventive circuit arrangements, of course, there may be used the conventional additional arrangements, such as linearity networks, high-voltage generator circuits for the cathode-ray tube operated by the voltage peaks occurring at the horizontal retrace, etc. Furthermore it is particularly appropriate to employ a toroid yoke system as a deflecting coil system, because this system, on account of its voltage stability, permits a high voltage $U_H$ across the condenser BC.

Of course, the invention is in no way limited to the represented examples of embodiment, but also other modifications, well-known to the one skilled in the art, are possible. Thus, for example, it is not necessary that the switching tube is a pentode, and the source of current UB does not need to be a battery.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A circuit for the generation of sawtooth currents in the deflecting coils of a cathode-ray tube, comprising an input tube having an anode, grid and cathode, a deflecting coil and storage condenser in series in the anode-cathode circuit of said output tube, a rectifier having an anode and cathodee connected in shunt with said series deflecting coil and condenser, and a transformer having one winding connected in series between the anode of said input tube and said deflecting coil and another winding in series with a second rectifier connected across said condenser.

2. A circuit as claimed in claim 1, wherein said rectifiers are in the form of a double diode in a single tube envelope.

3. A circuit as claimed in claim 1, further comprising a source of direct current for said system, wherein said another winding in series with said second rectifier is also connected in parallel across said condenser and said source.

4. A circuit according to claim 1, wherein said rectifiers are diodes.

5. A circuit according to claim 1, wherein said first rectifier is positioned with its anode connected to said condenser.

References Cited in the file of this patent

UNITED STATES PATENTS

| | | |
|---|---|---|
| 2,181,328 | Hermann | Nov. 28, 1939 |
| 2,225,300 | Geiger | Dec. 17, 1940 |
| 2,251,851 | Moore | Aug. 5, 1941 |
| 2,280,733 | Tolson | Apr. 21, 1942 |
| 2,308,908 | Bahring | Jan. 19, 1943 |
| 2,396,476 | Schade | Mar. 12, 1946 |